United States Patent [19]
Dean

[11] 3,833,138
[45] Sept. 3, 1974

[54] MEANS AND METHOD FOR STORING AIRCRAFT

[76] Inventor: Charles W. Dean, 2942 Palm Ave., Fort Myers, Fla. 33903

[22] Filed: Apr. 17, 1973

[21] Appl. No.: 351,950

Related U.S. Application Data

[62] Division of Ser. No. 175,514, Aug. 27, 1971, Pat. No. 3,756,419.

[52] U.S. Cl..................... 214/334, 108/51, 214/620
[51] Int. Cl.............................................. B60b 29/00
[58] Field of Search ........... 214/330, 331, 332, 333, 214/334, 620, 750, 621; 280/35; 244/115; 108/51

[56] References Cited
UNITED STATES PATENTS

| | | |
|---|---|---|
| 2,980,270 | 4/1961 | Elliott et al. .................... 214/334 |
| 3,025,985 | 3/1962 | Crawford .......................... 214/334 |
| 3,348,710 | 10/1967 | James .............................. 214/331 |
| 3,497,167 | 2/1970 | Adams et al. ..................... 244/115 |

*Primary Examiner*—Robert J. Spar
*Assistant Examiner*—Lawrence Oresky
*Attorney, Agent, or Firm*—Shoemaker and Mattare

[57] ABSTRACT

A means and method for storing aircraft comprising support frame means and lifting frame means or pallet means for supporting and storing an aircraft on said frame means. Said frame means is capable of accommodating one aircraft therein, as well as supporting another aircraft thereon in vertically spaced relationship to said one aircraft. A plurality of support frame means and pallet means may be provided for supporting a plurality of aircraft in spaced, stacked relationship.

11 Claims, 10 Drawing Figures

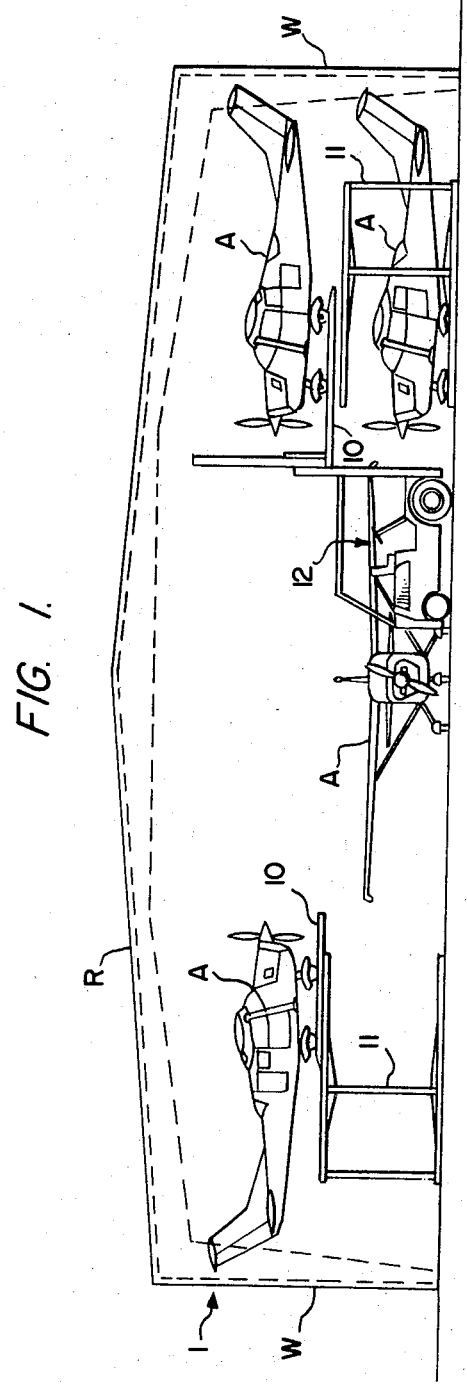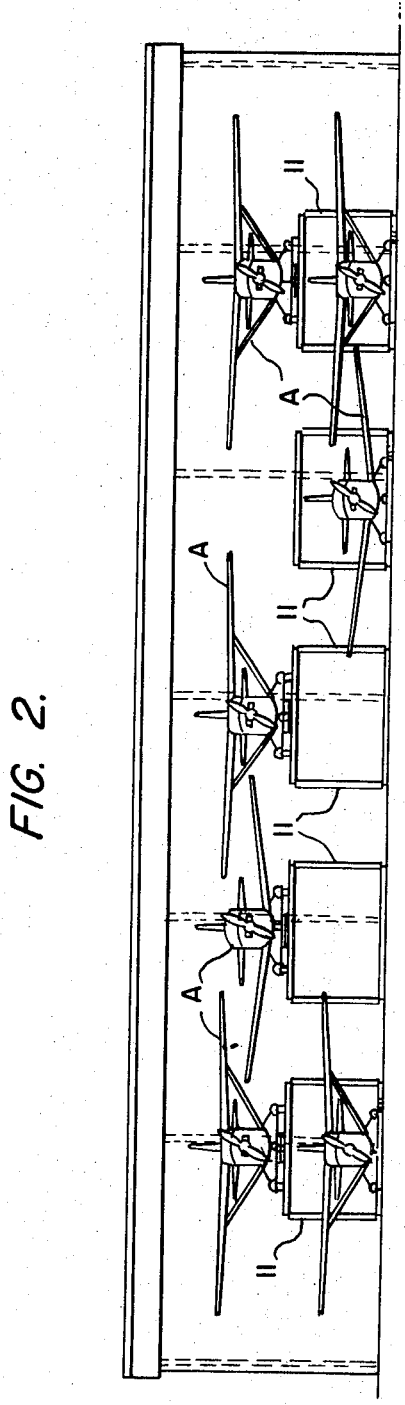

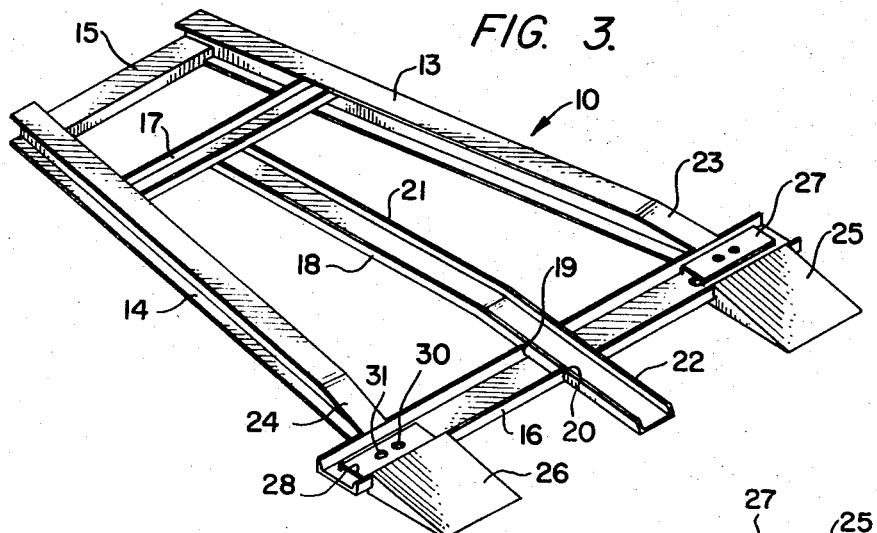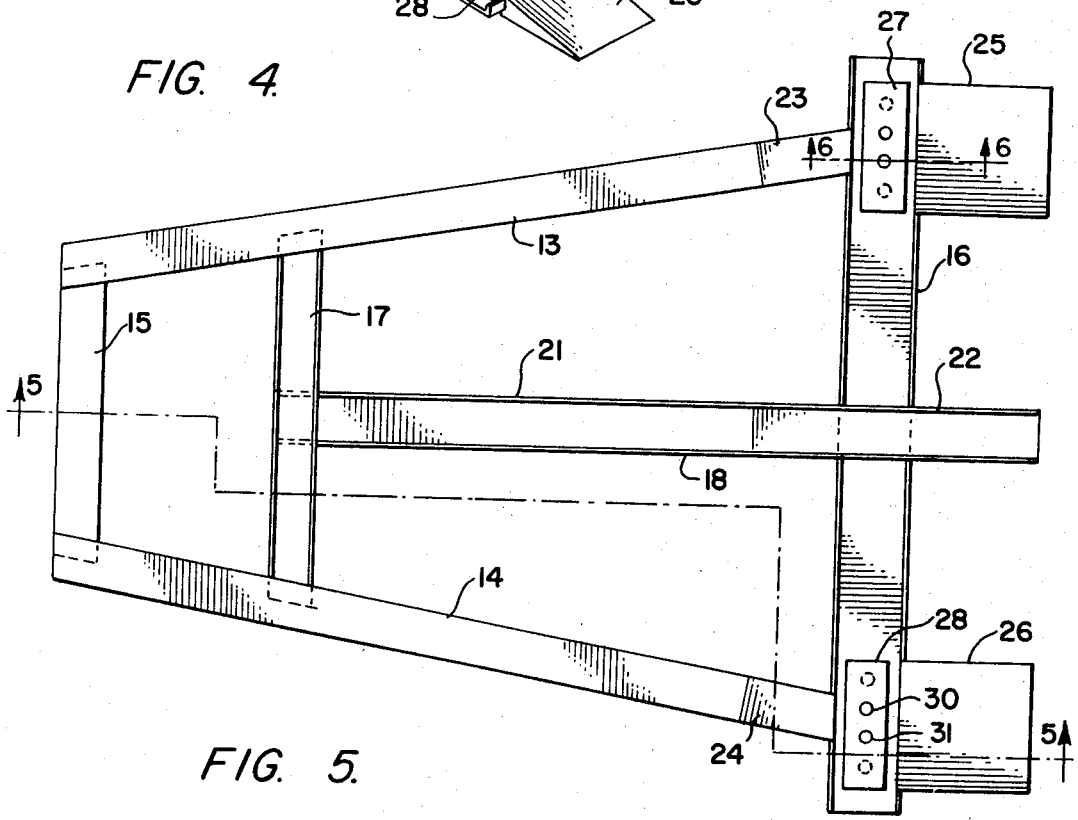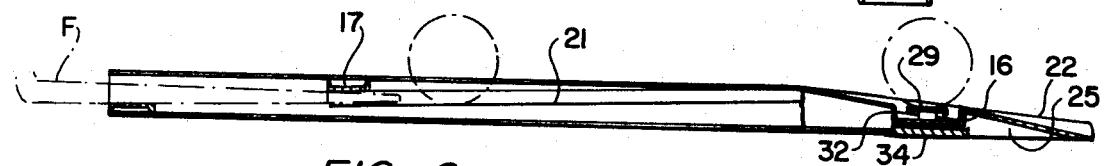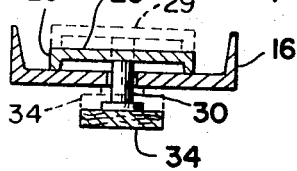

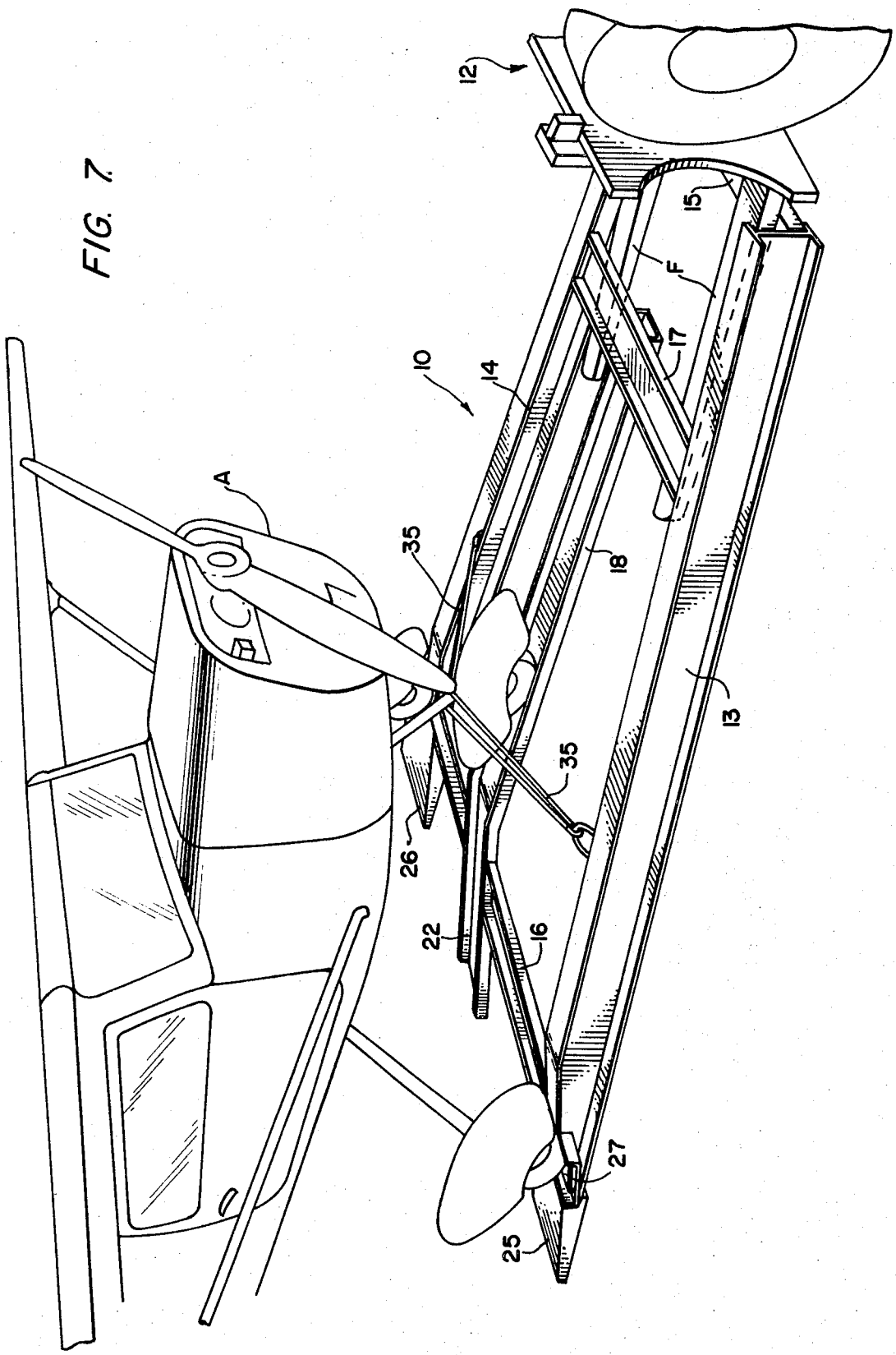

MEANS AND METHOD FOR STORING AIRCRAFT

BACKGROUND OF THE INVENTION

This invention relates to a means and method for storing aircraft. More particularly, this invention relates to a means for high density, low cost storage of aircraft wherein the aircraft are stored on spaced apart frame means and in vertically stacked relationship.

In the prior art, aircraft storage is costly due to the large amount of floor space required to store an aircraft. When a plurality of aircraft are stored side by side, only a limited number may be placed in a given area because of the wing span of the aircraft, since the wings of adjacent aircraft must be kept spaced apart.

According to the present invention, a support frame means is provided having support braces or portions thereon for supporting a lifting pallet. The lifting pallet includes means for guiding and supporting the wheels of an aircraft so that the aircraft may be positioned on the pallet and the pallet and aircraft lifted, as for example with a forklift or the like, and placed on top of the support frame means so that a plurality of aircraft may be stored in vertically stacked relationship. Accordingly, at least twice as many aircraft may be stored with the present invention as can be stored in the same space according to prior art methods. Further, the present invention enables the wings of adjacent aircraft to overlap, thus enabling the aircraft to be placed closer together in side-by-side relationship.

OBJECTS OF THE INVENTION

It is an object of this invention to provide a means and method of storing a maximum number of aircraft in a minimum amount of space.

Another object of this invention is to provide a means and method of storing aircraft wherein support frame means is provided for supporting a lifting pallet on which the aircraft is supported so that a plurality of aircraft may be stored in stacked relationship.

Yet another object of this invention is to provide a lifting pallet for handling aircraft, wherein means is provided for guiding and supporting the aircraft on the pallet, and said pallet has means so that it and an aircraft supported thereon may be lifted by a lifting implement, such as a crane or forklift or the like.

BRIEF DESCRIPTION OF THE DRAWINGS

FIG. 1 is an end view of an aircraft hanger or the like showing a plurality of aircraft stored therein according to the present invention.

FIG. 2 is a side view of the structure shown in FIG. 1 illustrating the manner in which a plurality of aircraft may be stored in side-by-side relationship according to the present invention.

FIG. 3 is a top perspective view of the lifting pallet of the present invention.

FIG. 4 is a plan view of the lifting pallet.

FIG. 5 is a side sectional view taken along line 5—5 in FIG. 4.

FIG. 6 is a sectional view taken along line 6—6 in FIG. 4.

FIG. 7 is a top perspective view of the lifting pallet with an aircraft supported thereon.

DETAILED DESCRIPTION OF THE INVENTION

Figure 8:
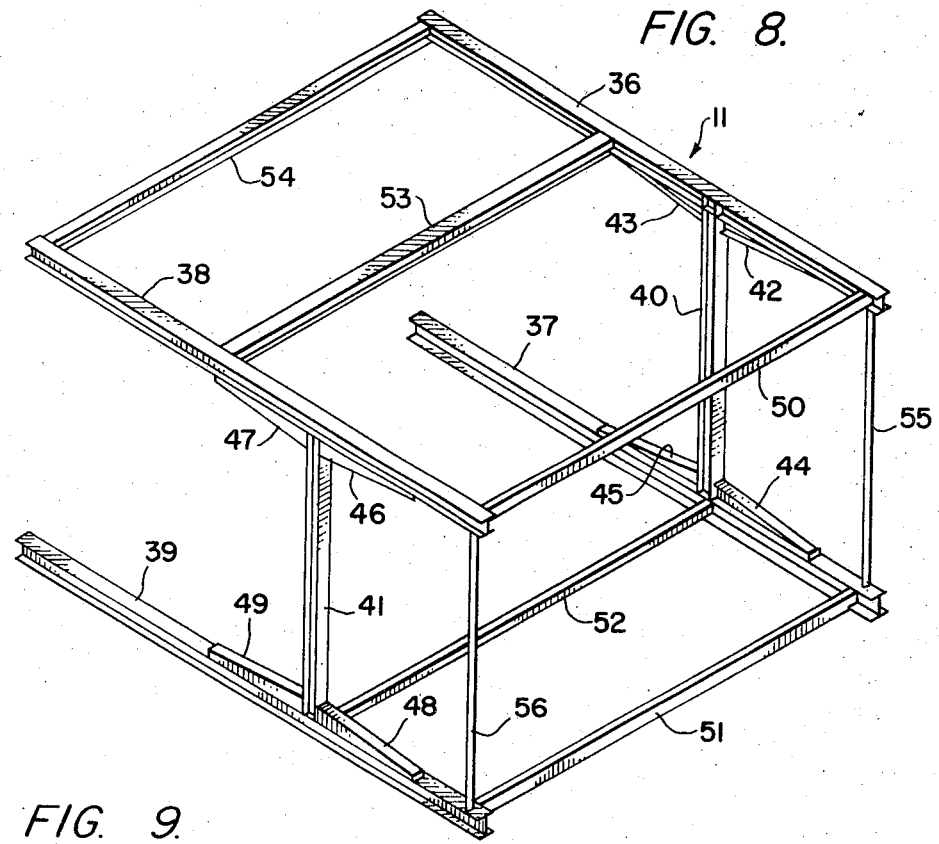
FIG. 8 is a top perspective view of the support frame of the present invention.

Referring now to the drawings, wherein like reference numerals refer to like parts throughout the several views, an aircraft hanger or the like is indicated generally at 1 in FIG. 1 and has a roof R and opposite side walls W. A plurality of aircraft A are shown stored in the hanger 1 with some of the aircraft resting on pallets 10 supported on support frames 11.

As seen in FIGS. 1 and 2, a plurality of aircraft A may be supported on the pallet and frames along the opposite sides of the hanger and additional aircraft A may be stored in the space between the rows of aircraft supported on the pallets and frames. A conventional forklift or the like 12 may be used for lifting and transporting the pallets and aircraft supported thereon.

Referring now to FIGS. 3 through 7, details of construction of the pallets 10 are illustrated. Each pallet 10 comprises a pair of spaced apart I-beam side frame members 13 and 14 converging toward one another at one end thereof and disposed with their flanges extending horizontally. An inverted, channel-shaped end frame member 15 is welded or otherwise suitably connected at its opposite ends to said side frame members 13 and 14 at said one end thereof and is disposed on top of the bottom horizontally extending flange of said side frame members.

A similar, but larger, inverted channel-shaped end frame member 16 is welded or otherwise suitably connected to the other ends of said side frame members 13 and 14 and projects a slight distance outwardly beyond the side frame members.

An intermediate, transverse channel-shaped frame member 17, substantially identical to frame member 15, is welded or otherwise suitably connected at its opposite ends to said side frame members 13 and 14 between the end frame members 15 and 16 and spaced closer to one said end frame member 15 than the other said end frame member 16. The intermediate frame member 17 is positioned against the bottom of the top horizontally extending flange of said side frame members with the channel opening upwardly and is spaced upwardly from the plane of said end frame member 15. A longitudinally extending, channel-shaped wheel ramp and support member 18 is welded or otherwise suitably connected at one end to the underside of said intermediate frame member 17 at substantially the middle of said intermediate frame member and extends at its other end through cut-out portions 19 and 20 in the vertically extending flanges of said end frame member 16. The wheel ramp and support member 18 includes a first portion 21 slightly downwardly inclined toward said intermediate frame member 17 and a second portion 22 at the other end thereof downwardly inclined toward the end frame member 16. The portion 22 extends outwardly and downwardly beyond end frame member 16 to a point substantially in the plane of the bottom of said side frame members 13 and 14, and below the plane of the end frame member 16.

Each of the side frame members 13 and 14 includes a downwardly sloping portion 23 and 24, respectively, extending from a point substantially in line with the juncture between portions 21 and 22 of wheel ramp and support member 18 and terminating substantially at the level of the top of the inside vertically extending flange of end frame member 16. Two relatively wide wedge-shaped wheel ramps 25 and 26 are suitably connected as by bolts or welds or the like to the outer edge of end frame member 16 adjacent the opposite ends thereof and in substantial alignment with the side frame members 13 and 14. The wheel ramps 25 and 26 have substantially the same slope as the portion 22 of wheel ramp and support member 18.

A pair of vertically movable wheel pads 27 and 28 are mounted in the channel of end frame member 16 adjacent the opposite ends thereof in line with wheel ramps 25 and 26. Each of the wheel pads comprises an inverted channel-shaped wheel supporting and engaging member 29 having a plurality of pins 30 and 31 connected thereto extending from the underside thereof through aligned openings 32 and 33 in the bottom of end frame member 16. The wheel pads are normally in the position shown in full line in FIG. 6 with the channel-shaped wheel supporting and engaging member 29 resting on the bottom of end frame member 16 and the pins projecting below the end frame member 16. When it is desired to remove an aircraft, the pallet is lowered onto a supporting surface, and in order to aid in removing the wheels of the aircraft from between the vertically extending flanges of end frame member 16, suitably means such as blocks of wood 34 or the like may be positioned on the supporting surface in alignment with the pins 30 and 31 so as to engage the pins and raise the wheel pads to the position shown in dotted line in FIG. 6. This elevates the wheels to a position substantially in alignment with the tops of the vertical flanges of end frame member 16.

Alternatively, the blocks 34 may be affixed directly to the pins 30 and 31, if desired, but this renders the aircraft susceptible of accidentally moving off of the pallet since the pads would be elevated anytime the pallet is resting on a supporting surface.

The pallet is primarily intended for use with aircraft having tricycle landing gear, such as small helicopters and airplanes, and in use, an aircraft is moved onto the pallet with the front wheel thereof received in and guided by the wheel ramp and support member 18, and the back wheels thereof guided by the wheel ramps 25 and 26 into the space between the vertical flanges of end frame member 16 onto the wheel pads 27 and 28. The forks F of a forklift 12 are then extended over end frame member 15 and under intermediate frame member 17 to lift the pallet and an aircraft supported thereon. The aircraft A may be suitably secured to the pallet by means of cables, ropes, chains or the like 35 secured to the front wheel of the aircraft and to the side frame members of the lifting pallet.

Figure 9:
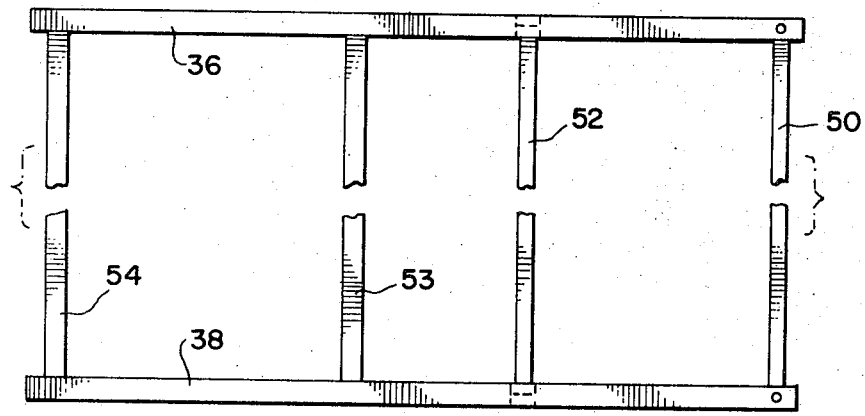
FIG. 9 is a plan view of the support frame.
Figure 10:
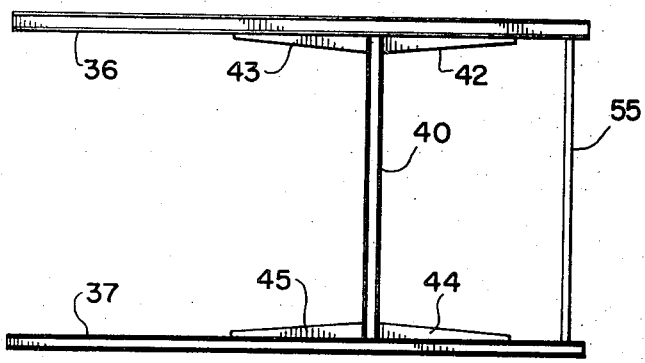
FIG. 10 is a side view of the support frame.

Referring now to FIGS. 8, 9 and 10, the support frame 11 for supporting the pallet 10 and aircraft A is shown. Each support frame 11 comprises a pair of vertically spaced, I-beam side frame members 36 and 37 at one side of the frame, and a pair of substantially identical I-beam side frame members 38 and 39 at the other side thereof. A vertically extending I-beam column or support 40 is suitably connected as by welding or the like at its opposite ends to the side frame members 36 and 37, spaced inwardly from one end thereof approximately one-third the length of the side frame members. An identical vertical I-beam column or support 41 is interconnected between the side frame members 38 and 39 at the opposite side of the frame, spaced inwardly along the side frame members approximately one-third the length thereof.

A pair of substantially identical, oppositely extending inclined braces 42 and 43 are suitably connected such as by welding or the like to the upper end of the vertical support 40 and the underside of the top side frame member 36. A substantially identical pair of braces 44 and 45 are suitably connected such as by welding or the like to the lower end of the vertical support 40 and the top surface of bottom side frame member 37. Substantially identical braces 46, 47 and 48, 49 are suitably connected as by welding or the like to the upper and lower ends, respectively, of the other vertical support 41, and the top and bottom side frame members 38 and 39. A first transverse channel-shaped cross frame member 50 is suitably connected as by welding or the like at its opposite ends to the top side frame members 36 and 38 adjacent one end thereof. The ends of the cross frame member 50 are received between the horizontally extending flanges of the top side frame members, with the flanges of the cross frame member extending in flat abutting relationship with the flanges of the side frame members. A substantially identical transverse channel-shaped cross frame member 51 is welded or otherwise suitably connected at its opposite ends to the bottom side frame members 37 and 39 in vertical alignment with the first transverse cross frame member 50. A third transverse channel-shaped cross frame member 52 is suitably connected as by welding or the like at its opposite ends to the bottom side frame members 37 and 39 at a point substantially in the plane of the vertical supports 40 and 41.

A pair of relatively large and strong transverse I-beam cross frame members 53 and 54 are welded or otherwise suitably connected at their opposite ends to the top side frame members 36 and 38. The cross frame member 54 is connected to the side frame members 36 and 38 adjacent the ends thereof opposite the first transverse cross frame member 50 and the cross frame member 53 is connected with the top side frame members 36 and 38 spaced inwardly from the ends thereof in substantial alignment with the outer end of the braces 43 and 47.

A pair of relatively small, cylindrical, vertically extending supports 55 and 56 are connected at their opposite ends with the adjacent ends of the pair of side frame members 36 and 37 and 38 and 39, respectively, to rigidify the structure and maintain the side frame members in parallel relationship.

In use, the support frames 11 are placed in spaced relationship along opposite sides of a hanger or the like as seen in FIGS. 1 and 2 and a forklift or the like is then used to lift a pallet 10 and aircraft A as previously explained. The pallet and aircraft are then placed on the support frame 11 with the pallet resting on the cross frame members 53 and 54. A second aircraft may be stored under the first aircraft and inside the support frame 11. Positioning of the vertical supports 40 and 41 closer to one end of the side frame members than the other enables the aircraft to be moved farther into the frame without interference between the wings of the aircraft and the vertical supports 40 and 41. The lateral spacing between the vertical supports 40 and 41 and 55 and 56 is such as to enable the tail section of the aircraft to project therethrough as seen in FIG. 1.

By selecting various designs of aircraft, i.e., high wing aircraft and low wing aircraft, for storage on adjacent support frames, the aircraft may be positioned more closely to one another with the wings extending in overlapping relationship to one another. By means of the present invention, wherein the aircraft are stored in vertically stacked relationship, at least twice as many aircraft may accordingly be stored in a given amount of hanger space as is possible with conventional storage structures. The support frames and pallets according to the present invention have sufficient size and strength to safely store most single engine aircraft having tricycle landing gear, and the unique pallet construction affords a simple and efficient way of handling aircraft for transporting them from one place to another and for placing them on and taking them from the support frames. Additionally, helicopters may be readily handled and stored with the present invention; and by enlarging the size of the pallets and support frames, larger aircraft can be handled and stored in accordance with the invention.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A pallet for handling and storing aircraft, comprising a pair of elongate, rigid, spaced apart side frame members, a pair of elongate, rigid, spaced apart end frame members connected at their opposite ends to opposite ends of said side frame members, one of said end frame members having wheel engaging and supporting means for supporting the wheels of an aircraft thereon, a transverse frame member connected at its opposite ends to said side frame members adjacent the other end frame member and vertically and horizontally spaced relative to said other end frame member so that the forks of a forklift can extend between said transverse frame member and said other end frame member substantially perpendicular thereto and between the side frame members to lift said pallet and an aircraft supported thereon, and an elongate, inverted channel shaped wheel ramp and support intermediate the side frame members and connected thereto and extending from one end thereof beyond said one end frame member toward and adjacent the other end frame member for engaging and supporting a wheel of an aircraft thereon.

2. A pallet for handling and storing aircraft, comprising a pair of spaced apart side frame members converging toward one another at one end thereof, a first transverse frame member connected at its opposite ends with said one end of said side frame members, a second transverse frame member connected at its opposite ends with said side frame members spaced axially inwardly from said one end thereof and in vertically spaced relationship to said first transverse frame member such as to accommodate and receive the forks of a forklift therebetween substantially perpendicularly to the axes thereof to lift said pallet and an aircraft supported thereon, a third transverse frame member connected adjacent its opposite ends with the other end of said side frame members, and an upwardly open, channel shaped wheel ramp and support means extending longitudinally between said side frame members to receive the wheel of an aircraft and connected at one end thereof between the ends of said second transverse frame member and connected adjacent the other end thereof with said third transverse frame member between the ends thereof.

3. A pallet for handling and storing aircraft, comprising a pair of spaced apart side frame members converging toward one another at one end thereof, a first transverse frame member connected at its opposite ends with said one end of said side frame members, a second transverse frame member connected at its opposite ends with said side frame members spaced axially inwardly from said one end thereof and in vertically spaced relationship to said first transverse frame member, a third, upwardly open, channel shaped transverse frame member connected adjacent its opposite ends with the other end of said side frame members, wheel ramps connected with said third transverse frame member on the side thereof opposite said side frame members and in substantial alignment with said side frame members for guiding the wheels of an aircraft onto said third transverse frame member, and an upwardly open, channel shaped wheel ramp and support means extending longitudinally between said side frame members to receive the wheels of an aircraft and connected at one end thereof between the ends of said second transverse frame member and connected adjacent the other end thereof with said third transverse frame member between the ends thereof.

4. A pallet as in claim 1, wherein the side frame members converge toward one another from said one end toward the other end of the pallet, and said transverse frame member is spaced axially inwardly and upwardly from said other end frame member to accommodate the forks of a forklift horizontally therebetween.

5. A pallet as in claim 1, wherein said one end frame member and said transverse frame member each have an inverted, channel shaped configuration, said transverse frame member adapted to receive a front wheel of an aircraft having a tricycle type landing gear and said one end frame member adapted to receive the rear wheels of said aircraft.

6. A pallet as in claim 1, wherein said transverse frame member is adapted to receive and support a wheel of an aircraft supported on the pallet and to be engaged by the forks of a forklift to lift the pallet.

7. A pallet as in claim 1, wherein said one end frame member has an inverted channel shape, inclined wheel ramps connected to said one end frame member adjacent the opposite ends thereof, and wheel pads movably mounted in the channel of said one end frame member in alignment with said wheel ramps and said side frame members for supporting the wheels of an aircraft positioned on said pallet in a lowered position in said channel to prevent accidental movement of the aircraft, said wheel pads including means for raising the wheel pads to elevate the wheels of an aircraft out of said channel so that the aircraft may be readily moved from said pallet.

8. A pallet as in claim 7, wherein said wheel pads are flat rectangular members, pin means connected at one end with said wheel pads and slidably received through aligned holes in said one end frame member, and means for engaging said pin means and raising said pin means and wheel pads to an elevated position to lift the wheel of an aircraft out of the channel of said one end frame member.

9. A pallet as in claim 8, wherein said means for engaging said pin means comprises at least one separate member positionable upon a supporting surface in alignment with said pin means for engaging said pin means when the pallet is lowered onto said supporting surface.

10. A pallet as in claim 1, wherein said channel shaped wheel ramp and support extends from its said one end upwardly over said one end frame member and then downwardly to its other end beneath said transverse frame member and connected at its other end to said transverse frame member.

11. A pallet as in claim 1, wherein said side frame members comprise I-beams and converge toward one another at said other ends thereof, said I-beam side frame members including upper and lower horizontally extending flanges and a vertically extending web, said transverse frame member comprising an inverted channel fixed at its opposite ends to said side frame members at the upper horizontally extending flanges of the side frame members, said channel shaped wheel ramp and support fixed at its other end to said transverse frame member, and said one end frame member having an inverted channel shape to receive the wheels of an aircraft therein.

* * * * *